United States Patent Office.

WILLIAM C. HUGHES, OF SCIO, MICHIGAN.

Letters Patent No. 74,826, dated February 25, 1868.

IMPROVED SELF-RAISING FLOUR.

The Schedule referred to in these Letters Patent and making part of the same.

TO ALL WHOM IT MAY CONCERN:

Be it known that I, WILLIAM C. HUGHES, of Scio, in the county of Washtenaw, and State of Michigan, have invented a new and improved Self-Raising Flour; and I do hereby declare that the following is a full, clear, and exact description thereof, which will enable others skilled in the art to make and use the same.

This invention or discovery relates to a new and useful method of preparing self-raising flour, and consists in a thorough and intimate incorporation of the fermenting principle with the flour when the grain is ground in a certain proportion, and at a low temperature, not exceeding blood-heat. The meal or flour of wheat, corn, and all other kinds of grain may be prepared to render itself rising, that is to say, so impregnated with the fermenting principle that for making bread therewith it will be only necessary to add and mix a little warm water to produce a dough that will rise well and make superior light bread.

My method of preparing this self-raising flour is to make pure hop-yeast in the form of cakes, composed of meal or flour, and thoroughly dried, and in the proportion of one-half pound of yeast, thus prepared and reduced to a powder, to sixty pounds of clean grain, well mixed with the yeast-powder; grind them together, care being taken to keep the temperature of the meal in grinding below blood-heat. The flour will be permeated in this manner with the fermenting principle, which will retain perfectly its full power to raise the dough, and make superior light bread whenever desired, by mixing it with warm water and working the dough in the usual manner before and after rising.

The ready self-raising flour will for this reason be a great convenience to housekeepers, as it will save the trouble of providing and adding yeast to every batch of bread made.

Having thus described my invention, what I claim as new, and desire to secure by Letters Patent, is—

The preparation of self-raising flour in the manner herein described.

The above specification of my invention signed by me, this 27th day of August, 1867.

WILLIAM C. HUGHES.

Witnesses:
A. D. CRANE,
A. H. MILLER.